US008502003B2

(12) United States Patent (10) Patent No.: US 8,502,003 B2
Siskin et al. (45) Date of Patent: Aug. 6, 2013

(54) BIOMASS CONVERSION USING CARBON MONOXIDE AND WATER

(75) Inventors: Michael Siskin, Westfield, NJ (US); Glen E. Phillips, Goldvein, VA (US); Simon R. Kelemen, Annandale, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 342 days.

(21) Appl. No.: 13/038,060

(22) Filed: Mar. 1, 2011

(65) Prior Publication Data

US 2011/0232162 A1 Sep. 29, 2011

Related U.S. Application Data

(60) Provisional application No. 61/317,573, filed on Mar. 25, 2010.

(51) Int. Cl.
*C10L 1/00* (2006.01)

(52) U.S. Cl.
USPC ........... 585/240; 585/242; 585/357; 585/408; 585/638; 585/733; 44/307; 44/308; 44/605; 44/606

(58) Field of Classification Search
USPC ................... 44/307–308, 605–606; 585/240, 585/242, 357, 408, 638, 733
See application file for complete search history.

(56) References Cited

U.S. PATENT DOCUMENTS

| | | | |
|---|---|---|---|
| 3,689,240 | A | 9/1972 | Aldridge et al. |
| 4,337,142 | A | 6/1982 | Knudson et al. |
| 4,605,762 | A | 8/1986 | Mandoki |
| 4,678,860 | A * | 7/1987 | Kuester ............................ 585/14 |
| 5,151,173 | A | 9/1992 | Vaughn et al. |
| 5,338,442 | A | 8/1994 | Siskin et al. |
| 5,360,537 | A * | 11/1994 | Strumskis ...................... 208/400 |

OTHER PUBLICATIONS

Keenan et al., "CRC Handbook of Chemistry and Physics and Steam Tables", Wiley-Interscience, New York (1969).
Franck, "Fluids at High Pressures and Temperatures", Journal of Chemical Therrmodynamics, vol. 19, pp. 225-242 (1987).
Siskin et al., "Reactivity of Organic Compounds in Hot Water: Geochemical and Technological Implications", Science, Articles, vol. 254, pp. 231-237 (Oct. 11, 1991).
Siskin et al., "Asphaltene Molecular Structure and Chemical Influences on the Morphology of Coke Produced in Delayed Coking", Energy & Fuels, vol. 20, pp. 1227-1234 (2006).
Demirbas, "Thermochemical Conversion of Biomass to Liquid Products in the Aqueous Medium", Energy Sources, vol. 27, pp. 1235-1243 (2005).
Baltisberger et al., "Carbon Monoxide-Water vs. Hydrogen for Liquefaction: The Reduction of Diphenylsulfide, Thioanisole and Dibenzothiophene", Department of Chemistry, University of North Dakota, Grand Forks, ND 58202, pp. 74-79.
Breslow, "Hydrophobic Effects on Simple Organic Reations in Water", Accounts of Chemical Research, vol. 24, No. 6, pp. 159-164 (Jun. 1991).
Elliott et al., "Liquid Hydrocarbon Fuels From Biomass", American Chemical Society, Division of Fuel Chemistry, Preprints, vol. 34, No. 4, pp. 1160-1166 (1989).
Siskin et al., Aqueous Organic Chemistry, 5. Diaryl Ethers: Diphenyl Ether, 1-Phenoxynaphthalene and 9-Phenoxyphenanthrene, Fuel, vol. 72, No. 10, pp. 1435-1444 (1993).
Campbell et al., "Polyurethane Foam Recycling Superheated Steam Hydrolysis", Environmental Science & Technology, vol. 10, No. 2, pp. 182-185 (Feb. 1976).
Pitzer, "Dielectric Constant of Water at Very High Temperature and Pressure", Proceeding of the National Academy of Sciences USA, vol. 80, pp. 4575-4576 (1983).
Ringer et al., Large-Scale Pyrolysis Oil Production: A Technology Assessment and Economic Analyis, Technical Report NREL/TP-510-37779 (Nov. 2006).
Appell et al., "Coal Liquefaction With Synthesis Gas", Pittsburgh Energy Technology Center, Pittsburgh, Pennsylvania, (Sep. 1979).
Rocha et al., "The Scope for Generating Bio-Oils With Relatively Low Oxygen Contents Via Hydropyrolysis", Organic Geochemistry, vol. 30, pp. 1527-1534 (1999).
Matsumura et al., "Supercritical Water Treatment of Biomass for Energy and Material Recovery", Combustion Science and Technology, vol. 178, pp. 509-536, (2006).
Stenberg et al., "Carbon Monoxide-Hydrogen-Water: Reduction of Anthracene, Dihydroanthracene, and Quinoline", Journal of Organic Chemistry, vol. 43, No. 15, pp. 2991-2994 (1978).
Boocock et al., "The Liquefaction of Poplar by Rapid Aqueous Pyrolysis: Results From Semi-Continuous and Batch Units", Department of Chemical Engineering, University of Toronto, Toronto, Ontario, M5S 1A4, pp. 450-454.
Kinstle et al., "Chemical Intermediates From Scrap Polymers via Hydrolysis", Department of Chemistry, University of Tennessee, Knoxville, TN 37996, pp. 446-447.
Akerlof et al., "The Dielectric Constant of Water at High Temperatures and in Equilibrium With Its Vapor", Koppers Company Research Fellowship, Mellon Institute and the Department of Physics, University of Pittsburgh, vol. 72, pp. 2844-2847 (Jul. 1950).
Scott et al., "The Continuous Flash Pyrolysis of Biomass", The Canadian Journal of Chemical Engineering, vol. 62, pp. 404-412 (Jun. 1984).
Davis et al., "The Chemistry and Stoichiometry of Wood Liquefaction", Biotechnology and Bioengineering Symposium, No. 11, pp. 151-169 (1981).
Schaleger et al., "Direct Liquefaction of Biomass: Results From Operation of Continuous Bench-Scale Unit in Liquefaction of Water Slurries of Douglas Fir Wood", Biotechnology and Bioengineering Symposium, No. 12, pp. 3-14 (1982).
Gregoire et al., "Technoeconomic Analysis of the Production of Biocrude From Wood", Biomass and Bioenergy, vol. 7, Nos. 1-6, pp. 275-283 (1994).

* cited by examiner

*Primary Examiner* — Brian McCaig
(74) *Attorney, Agent, or Firm* — Glenn T. Barrett; Malcolm D. Keen

(57) ABSTRACT

A lignocellulosic biomass material is converted into precursors for liquid hydrocarbon transportation fuels by contacting the biomass material with water and carbon monoxide at elevated temperature, typically from 280 to 350° C., an elevated pressure, typically a total system pressure of 12 to 30 MPa and a CO partial pressure from 5 to 10 MPa and a weight ratio of water:biomass material from 0.5:1 to 5.0:1, to dissolve the biomass material into the reaction mixture and depolymerize, deoxygenate and hydrogenate the lignocellulose biomass material, so converting the biomass material into liquid transportation fuel precursors.

16 Claims, No Drawings

US 8,502,003 B2

BIOMASS CONVERSION USING CARBON MONOXIDE AND WATER

CROSS REFERENCE TO RELATED APPLICATIONS

This application relates and claims priority to U.S. Provisional Application No. 61/317,573, filed on Mar. 25, 2010. This application is also related to co-pending U.S. patent application Ser. No. 13/038,093 entitled "Biomass Oil Conversion using Carbon Monoxide and Water" filed on Mar. 1, 2011, which claims priority to U.S. Provisional Patent Application No. 61/317,579, filed on Mar. 25, 2010.

FIELD OF THE INVENTION

The present invention relates to a process for the production of transportation fuels by the conversion of biomass.

BACKGROUND OF THE INVENTION

Petroleum is currently estimated to account for over 35% of the world's total commercial primary energy consumption. Coal ranks second with 23% and natural gas third with 21%. The use of liquid hydrocarbon fuels on an enormous scale for transportation has led to the depletion of readily accessible petroleum reserves in politically stable regions and this, in turn, has focused attention, economically, technically and politically on the development of alternative sources of liquid transportation fuels. Liquid hydrocarbons are far and away the most convenient energy sources for transportation in view of their high volumetric energy. The energy density of gasoline, for example at about 9 kWh/litre and of road diesel at about 11 kWh/litre, far exceeds that of hydrogen (1.32 kWh/litre at 680 atm, or batteries, 175 Wh/kg. Furthermore, the liquid hydrocarbon fuel distribution infrastructure is efficient and already in place.

Conversion of coal into liquid hydrocarbon fuels has been used in the past in various countries to supplement or replace imported petroleum fuels, most notably by Germany during World War II when the Bergius and Fischer-Tropsch processes were used on a large scale and sporadically in the United States when petroleum crude prices were considered to have reached politically excessive levels. Processes for using large coal reserves have received attention in the United States, both in the direction of enabling coal to be burned with lower pollution emissions, e.g., Solvent Refined Coal, and in processes for converting coal into liquid fuels by alternative processes, for example, by the CO-Steam Process investigated at the Grand Forks Energy Research Center in North Dakota during a previous moment of national political panic. In this process, lignite is converted to boiler fuel by the reaction of a finely ground slurry of lignite in a hydrocarbon donor solvent with carbon monoxide, steam and hydrogen at about 450° C. and pressures up to about 35 MPa (5000 psi), as described in U.S. Pat. No. 4,337,142 (Knudson). Variants of this process subsequently considered, but not brought to commercial use, included the lower temperature aqueous-CO pretreatment process for low rank coals derived from terrestrial material, not significantly structurally different from lignin, peat and lignite coals. This process, described in U.S. Pat. No. 5,151,173 (Vaughan) significantly decreased the oxygen content of lignite and sub-bituminous (lower rank) coals, increased the H/C atomic ratio and increased the extractability of the coal without addition of molecular hydrogen. High pressures comparable to those used in the CO-Steam process were found to be necessary, With the degree of attention being given currently, not so much to terrestrial petroleum shortage but rather, to excess atmospheric greenhouse gases, the use of biomass as a source of liquid fuels is receiving widespread public and governmental attention as well as numerous government subsidies for biomass research projects. Biomass is considered to be desirable as a source of liquid fuels from biomass for the transportation sector because $CO_2$ released from vehicle exhaust is captured during biomass growth making the process essentially carbon neutral. While direct, carbon-neutral use of biomass as fuel is established, for example, biodiesel, this route is limited because the limited choice of source materials, e.g., vegetable oils. Conversion of a wider variety of biomass sources into more traditional types of fuel, principally hydrocarbons, is the more attractive option.

Currently, there are two major routes for conversion of biomass to liquid fuels: biological and thermo-chemical. In the biological process, fermentation of easily fermentable plant products, such as, for example, sugars to alcohols is achieved. These easily fermentable plant products can be extracted from corn kernels, sugar cane and etc. The major disadvantage of this pathway is that only a fraction of the total carbon in biomass is converted to the final desired liquid fuel. It has been calculated that conversion of all corn produced in USA to ethanol can meet 12% of entire US demand for gasoline which reduces to 2.4% after accounting for fossil fuel input required to produce the ethanol. Similarly, an approximate estimate for the land area required to support the current oil consumption of about 2 million cubic metres per day by the US transportation sector is of the order of 2.67 million square km which represents 29% of the total US land area, using reasonable assumptions for the efficiency of the conversion process, thus suggesting that large scale production of liquid fuels from such a biomass conversion process is impractical.

While other processes for converting biomass to liquid fuels have been proposed, none has so far achieved large scale commercial success. Various problems exist, including major capital and operating expenses including high energy input requirements making the overall conversion unattractive and the need to use large process units to gain any reasonable production rate. Economics has therefore played a significant role in inhibiting the adoption of biomass conversion processes.

SUMMARY OF THE INVENTION

We have now devised a process for the conversion of biomass into transportation fuel precursors which does not rely upon gasification and which uses cheap, readily available materials in the conversion.

According to the present invention, biomass, preferably one high in lignin content, i.e., derived from a high lignin lignocellulosic material, is converted into precursors for liquid hydrocarbon transportation fuels by the use of carbon monoxide and water at high temperatures. In a typical application of the process, the lignocellulosic biomass material is contacted with water and carbon monoxide at elevated temperature of 280 to 370° C., an elevated pressure total system pressure of 12 to 30 MPa, a CO partial pressure from 5 to 10 MPa and a weight ratio of water:biomass material from 0.5:1 to 5.0:1. The biomass material becomes dissolved into the reaction mixture where reactions with water and the carbon monoxide take place to depolymerize, deoxygenate and hydrogenate the lignocellulose biomass material and so form a reaction product comprising liquid transportation fuel precursors. These synthetic fuel precursors may then be worked up into synthetic hydrocarbon liquid and gaseous fuels for transportation and other uses by conventional processing schemes.

DETAILED DESCRIPTION

Biomass is conventionally defined as the living and recently dead biological material that can be converted for use as fuel or for industrial production. The criterion as biomass is that the material should be recently participating in the carbon cycle so that the release of carbon in the combustion process results in no net increase averaged over a reasonably short period of time (for this reason, fossil fuels such as peat, lignite and coal are not considered biomass by this definition as they contain carbon that has not participated in the carbon cycle for a long time so that their combustion results in a net increase in atmospheric carbon dioxide). Most commonly, biomass refers to plant matter grown for use as biofuel, but it also includes plant or animal matter used for production of fibers, chemicals or heat. Biomass may also include biodegradable wastes that can be burnt as fuel including municipal wastes, green waste (the biodegradable waste comprised of garden or park waste such as grass or flower cuttings and hedge trimmings), byproducts of farming including animal manures, food processing wastes, sewage sludge, black liquor from wood pulp or algae. Biomass excludes organic material which has been transformed by geological processes into substances such as coal, oil shale or petroleum. Biomass is widely and typically grown from plants, including miscanthus, spurge, sunflower, switchgrass, hemp, corn (maize), poplar, willow, sugarcane, and oil palm (palm oil) with the roots, stems, leaves, seed husks and fruits all being potentially useful. The particular plant or other biomass source used is not important to the product liquid transportation fuel although the processing of the raw material for introduction to the processing unit will vary according to the needs of the unit and the form of the biomass. The biomass materials which are preferred are those which contain a higher proportion of lignins relative to celluloses and hemicelluloses since it is the lignins which, in the water treatment, produce greater quantities of the fuel precursors. Since lignin plays a significant role in the carbon cycle, sequestering atmospheric carbon into the living vegetable, the use of the lignin derivatives as fuels will be carbon-neutral. Further, the conversion of lignin in biomass which contains higher organic oxygen concentrations would be more facile than with low rank coals. Biomass materials with high lignin content are the preferred materials for use in the present process; lignin contents of at least 35 percent would produce greater amounts of the fuels while at least 50 percent lignin would be preferred, if feasible.

In the present process, the biomass, after any necessary comminution and necessary pre-drying to improve handling and amenability to the treatment with the water, is brought into contact with water and carbon monoxide under conditions of elevated temperature and pressure. Organic compounds, including the lignocellulosic material typically found in solid biomass dissolve in the water and, once dissolved, the water will efficiently break cellulose and other bonds. Hydrogenation reactions on the biomass material and cleavage products will proceed to increase the hydrogen content of the biomass without the necessity to generate hydrogen as a separate reactant.

Superheating the water to a temperature of at least 200 or 300° C. and preferably at least 374° C. is preferred for the present treatment. Appropriate pressures, typically at least autogeneous will maintain the water in the liquid state and this is preferred in order to secure satisfactory reaction rates in the biomass reaction. Pressures at temperatures of this order will typically be at least 15 MPa (2175 psi) and may be at least as high as 20 MPa (2900 psi).

High temperature water under autogenic or higher pressure provides a significantly more favorable reaction medium for insoluble organic compounds than does water at temperatures up to its boiling temperature (at 1 bar). The solvent properties of liquid water (density, dielectric constant) at high temperature are similar to those of polar organic solvents at room temperature, thus facilitating the solubility of organic compounds and their reactions. At 300° C., for example, water exhibits a density and polarity similar to those of acetone at room temperature: the solubility parameter decreases from 23.4 to 14.5 cal/cm$^3$. The dielectric constant drops rapidly with temperature, and at 300° C. has fallen from 80 (at 20° C.) to 2. Therefore, as the water temperature is increased, the solubility of non-polar organic compounds increases much more than expected for the natural effect of temperature and the reactions with the biological materials are facilitated to this extent.

When superheated liquid water is used in the range from about 200° C. to below the critical temperature of water, 374° C., more preferably from about 250° C. to about 350 or 370° C., the pressures will be autogenous or higher. The corresponding vapor pressure needed to maintain water in the liquid state at these temperatures ranges from 1550 kPa (225 psi) at 200° C. to about 10.6 MPa (1532 psi) at 350° C. to about 22 MPa (3200 psi) at 374° C. Vapor pressure values are readily determinable by reference to standard texts such as the CRC Handbook of Chemistry and Physics and Steam Tables by J. H. Keenan, F. G. Keyes, P. G. Hill and J. G. Moore, Wiley-Interscience, New York, 1969 . . . .

When superheated to temperatures below the critical point and maintained under autogeneous pressure, the water will remain in the liquid state rather than passing into the supercritical characteristic state in which the properties are intermediate those of the vapor state and the liquid. Above the critical point, (critical point for water is 374° C. and 22 MPa (3190 psi), at which it has a relative density of 0.322), supercritical fluids generally possess unique solvating and transport properties compared to liquids or gases. Supercritical fluids can have liquid-like densities, gas-like diffusivities, and compressibilities that deviate greatly from ideal gas behavior and under supercritical conditions, solid solubility often is enhanced greatly with respect to solubility in the gas or liquid solvent. Supercritical water in particular has the ability to dissolve materials not normally soluble in liquid water or steam and it also promotes certain chemical reactions. When heated above this point, the superheated water becomes supercritical and, as such, water has been found to be a preferred medium for the conversion of the biomass.

Organic molecules containing oxygen functionalities such as are commonly found in lignocellulose biomass undergo a wide range of chemical reactions in neutral superheated or supercritical water. In superheated water, below the critical temperature of water, these reactions proceed mainly via ionic vs. thermal free radical pathways. Above the critical temperature, a competition between ionic and thermal free radical pathways would be expected, with radical pathways catching up and finally predominating as temperature increases. Condensation type polymers, polymers containing, e.g., ester, ether, and amide linkages are likely to be cleaved to their starting materials at 300° C. and above and esters, ethers, sulfides, amines and even diaryl ethers cleave rapidly, carboxylic acids are decarboxylated (—$CO_2$) and aldehydes are decarbonylated (—CO). Such reactions effect cleavage of cross-links containing oxygen, nitrogen and sulfur moieties with the concurrent loss of much of these heteroatoms. These as well as many others, are facilitated by changes in the chemical and physical properties of water as temperature increases.

Superheated water at 350° C. and ~2400 psi (Hydrothermal Liquefaction (HTL) conditions) is in the liquid state and will react with e.g., lignin, to hydrolytically cleave linkages such as those typically found in biomass materials, including ethers and esters (including carbonate esters) and amides. Under these conditions, ester linkages in the biomass are cleaved into an acid and an alcohol; the acid formed is then decarboxylated with the water acting as an acid, base or acid-base bi-catalyst (–log Kw=11.3 vs. 13.99 at 25° C.). The alcohol dehydrates under the same conditions to form an olefin. Amide bonds cleave to form amines and diols; the diols can subsequently dehydrate to olefins while the amines lose ammonia to form alkanes or olefins. These reactions are strongly catalyzed by the acidity of the water at high temperature and autocatalyzed by acidic reaction products. Depolymerization and deoxygenation of biomass are therefore efficient under these conditions to form a product, typically in the form of a viscous, oily mass which can subsequently be worked up as a precursor of liquid transportation fuels, An increase in the dissociation constant by three orders of magnitude allows water at temperatures of 200° C. or higher to act as an acid, base, or acid-base bi-catalyst without the need for costly and cumbersome neutralization and catalyst regeneration steps. The negative logarithmic ionic product of water [pKw] at 250° C. is 11, as compared to 14 at 20° C., which means that water becomes both a stronger acid and a stronger base as the temperature increases. Therefore, in addition to the natural increase in kinetic rates with temperature, both acid and base catalysis by water are enhanced at higher temperatures. Accordingly the water/biomass conversion may be carried out in the absence of any additional catalyst although trace amounts of acid can be added to facilitate these reactions while acidic species generated during the conversion process can autocatalyse the cleavage and deoxygenation reactions as described above. Also, since water soluble conversion products (i.e., hydrolysis products) may include acidic products, basic products, reducing agents and oxidizing agents, that effect further conversion and upgrading of the biomass resource material, recycle enrichment of these materials presents another viable processing option.

In the presence of the heated water and the carbon monoxide, the dissolved lignocellulosic biomass is posited to enter into the following reaction steps:

$$CO + OH^- \rightarrow HCO_2^-$$

$$HCO_2^- + [\text{Ligno-Biomass}] \rightarrow [\text{Ligno-Biomass}]H^- + CO_2$$

$$[\text{Ligno-Biomass}]H^- + H_2O \rightarrow [\text{Ligno-Biomass}]H_2 + OH^-$$

Overall:

$$H_2O + CO + [\text{Ligno-Biomass}] \rightarrow [\text{Ligno-Biomass}]H_2 + CO_2$$

Thus, donatable hydrogen from the water is incorporated into the lignin-containing biomass. For example, hydrogenation of ring systems in the lignin matrix to form hydroaromatics is thought to be facilitated under these conditions. Hydroaromatics comprise one class of compounds that can donate hydrogen to cap free radicals during subsequent processing of the reaction mixture and thus mitigate undesirable condensation reactions which yield less reactive high boiling fractions. This hydrogenation of the biomass during pretreatment may be a factor responsible in favor of enhanced reactivity of the reaction product.

Depolymerization reactions may occur not only by the action of the superheated water but also by the mediation of the carbon monoxide. The potential role of the carbon monoxide in the depolymerization is not, however, well marked. The ability may be attributable to bond breaking activity or to the removal of potential cross-link sources which cause repolymerization to higher molecular weight products following hydrothermal bond rupture. The major depolymerization reactions are thought to be acid catalyzed, in which the superheated water acts as an acid catalyst. The acidic functionalities and acidic materials in the biomass components as well as soluble acidic products which are generated during the pretreatment may be effective in acting synergistically to enhance conversion. Small amounts of formic acid are formed by the reaction of carbon monoxide with water and the formic acid can act both as an acid catalyst and as an hydride ion donating reducing/hydrogenation agent. Since a significant proportion of the aqueous chemistry involved in the carbon monoxide treatment is believed to involve oxygen-containing substituents attached to aromatic ring systems. The aqueous CO treatment is especially effective with oxygen rich lignocelluloses.

Pretreatment of the biomass according to the present invention is suitably carried out in a reactor of appropriate construction and design capable of withstanding the hereafter described conditions of pretreatment. A stainless steel cylindrical vessel with inlet port(s) for the biomass and water/steam/carbon monoxide inlet and product removal lines is suitable. Any sludge-like residue which remains can be sent to a coker or burned as fuel for the process.

The water employed in the process is preferably neutral, i.e. about pH 7 and substantially free of dissolved oxygen to minimize the occurrence of undesirable free radical reactions. Certain weight ratios of water to organic resource material drive the reaction at faster rates. Therefore, a weight ratio of water to biomass material in the range from about 0.5 to about 10 is preferred, and more preferably from about 0.5 to 5.0, most preferably 0.5 to 2, most preferably above 1:1; the preferred ratios at reactor inlet are about 1.25:1 to 4:1, most preferably 1.5:1 to 2:1, and at least 1:1.

An added organic solvent, immiscible or miscible with water, may be employed to enhance dispersion and flowability of the biomass and the reaction products. Suitable solvents may include alcohols such as ethanol, isopropyl alcohol, ketones, phenols, and carboxylic acids. The acids may also act as catalysts in the reaction mechanisms. By-products of the treatment, concentrated and accumulated in a recycle water stream are a readily available source of such organic compounds. The ratio of organic solvent-to-biomass (dry basis) is preferably about 0.25:1 to 1:1.

The contacting is normally for a period of time ranging from about 0.1 second to several hours with shorter contact times being possible at higher temperatures; typically, contact times will be from 5 seconds to about 4 hours, and preferably 1 minute to 2 hours.

The treatment temperature may be expected to affect the quality of the reaction product. This effect may be a consequence of the thermodynamics of the treatment reaction system that in general tends toward dehydrogenation at higher temperatures so that the highest temperatures at which the reaction is kinetically favored may result in a deterioration of the product. Therefore, to some extent, the reaction temperature selected is a compromise between competing effects. Temperatures within the range of 250 to 400 C.° are likely to be suitable depending on the biomaterial used as feed. Within that range, there is a preferred range of about 280 to 350° C. A catalyst/promoter will allow the treatment reaction to proceed at a satisfactory rate at relatively lower temperatures but below 250° C., uncatalyzed/unpromoted pretreatment reactions are too slow. An alternative embodiment is to temperature stage the pretreatment reactions by initially maintaining the temperature in the above mentioned 250-400° C. range for part of the time and then increasing the temperature to a range between 350° to 425° C.

Carbon monoxide pressure is another treatment process parameter. Higher CO pressures probably directly affect the formate ion concentration in the reaction system by shifting the reaction equilibrium to the right as follows:

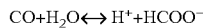

$$CO + H_2O \leftrightarrow H^+ + HCOO^-$$

There is a potentially increasing improvement in the reaction product properties with increasing CO partial pressure. A suitable range is 3 to 10 MPa (initial) at ambient temperature, preferably about 5 to 7 MPa. Total system pressure at reaction conditions (including $H_2O$ vapors, $CO_2$, $H_2$, CO, and $C_1$-$C_4$) is suitably in the range of about 12 to 30 MPa, preferably about 20 to 24 MPa, depending on the partial pressure of the CO and the temperature, which in turn determines the water partial pressure.

Generally, the quality of the reaction product improves with increasing residence time in the treatment. A suitable residence time at about 300° C. ranges from about 10 minutes to 5 hours, preferably, from an economic standpoint, 20 minutes to 2 hours, most preferably about 80 minutes.

Efficient mixing and good contact between the CO and water reactants and the biomass can be accomplished with a mechanical stirrer and/or with stationary baffles that create high turbulence, or properly designed inlet gas spargers that produced small gas bubbles.

Recycle of the aqueous phase to the reactor is an optional feature which can provide certain advantages. Recycle may aid in dissolution of the biomass as a result of the alcohols, phenols, and carboxylic acids contained in the recycle solution; the acidic components in the recycled aqueous phase may also act as catalysts for the reactions in addition to the activity of the high temperature water. A recycle rate of 3:1 to 10:1 is suitable (ratio of recycle to makeup water).

It has been found that certain chemical compounds act as promotors to significantly increase the hydrogen to carbon (H/C) ratio of the treated biomass. Suitable promoter compounds include sodium or calcium formate, sodium hydroxide, sodium carbonate, sodium bicarbonate, formic acid, calcium hydroxide, calcium acetate, calcium oxide, sodium sulfite, ammonium sulfide, ammonium bisulfide, hydrogen sulfide and the like.

According to the chemistry proposed for the treatment, explained above, it is believed that an important active intermediate is the formate anion generated by the reaction of CO and water. Metal ions such as calcium, magnesium, sodium, lithium or potassium are believed to stabilize this formate anion by forming a formate salt. Formic acid and formate anion are believed to donate hydrogen via an hydride ion to the biomass and so, by increasing the concentration of formate ion in the system, the extent of hydrogenation of the biomass may be increased. Acidic promotors such as acetic acid are believed to be capable of promoting the reaction chemistry by making available soluble metal ions from the biomass. Such acids are believed to ion exchange with metals such as calcium in the biomass and form an equilibrium with calcium salts in solution. Such salts in turn undergo ion-exchange with formic acid, which is thereby stabilized with metal cations to form a formate salt.

In view of the above, either acids or soluble metal salts of acids or bases can act as promotors. The most preferred promotors are ammonium salts and metal salts wherein the metal is in Group IA, Group IIA, or Group IIB of the Periodic Table, for example sodium or calcium formate and ammonium sulfide or bisulfide. Calcium or sodium hydroxide or oxides are also preferred. Other compounds may be preferred in certain process applications, for example CaO is low in cost and acetic acid is easily recovered. Process derived salts of acids and acids derived from the biomass have the advantage that at steady state they are potentially cost free. For example, calcium and sodium salts of acetic acid, formic acid, propionic acid, lactic acid and the like are made during the treatment and may be concentrated or accumulated in a water recycle stream to the treatment zone.

The promotors should be present in the treatment reaction system in the amount by weight of 0.5 to 10%, preferably 1 to 5%. However, certain low cost promotors, for example, ammonium bisulfide, ammonium sulfide or hydrogen sulfide, may be added in much higher amounts.

The fuels precursor which results from the reaction is characterized by a lower molecular weight and lower oxygen content than most biomass products and a higher hydrogen content derived from the water. This is a result of the unique conversion properties of the superheated/CO water system when applied to biological materials. Depolymerization results in the formation of liquid or semi-liquid products of varying viscosities which will combine with solids present in the mass to dissolve or disperse them and produce a rather viscous, reaction product which can be worked up in the same or similar manner to a petroleum crude following a filtration which is optional depending on how the product is eventually processed, of any remaining solids. For example, it may be used as coker feed, or visbreaker feed. Feed to an FCC unit is preferably hydrotreated to remove sulfur and nitrogen compounds which may remain and which, if not removed, will adversely affect catalyst performance and longevity in the cracking process. Hydrocracking is also an option.

The invention claimed is:

1. A process for the conversion of biomass material into precursors for hydrocarbon transportation fuels which comprises contacting the biomass material with liquid superheated water at a temperature of at least 200° C. and carbon monoxide at elevated pressure to convert the biomass into liquid transportation fuel precursors.

2. A process according to claim 1 in which the water is liquid superheated water at a temperature of at least 300° C.

3. A process according to claim 1 in which the water is in the supercritical state at a temperature of at least 374° C. and a pressure of at least 22 MPa.

4. A process according to claim 1 in which the biomass material comprises plant matter, biodegradable wastes, byproducts of farming, food processing wastes, sewage sludge, black liquor from wood pulp or algae.

5. A process according to claim 4 in which the plant matter comprises the roots, stems, leaves, seed husks and fruits of miscanthus, spurge, sunflower, switchgrass, hemp, corn (maize), poplar, willow, sugarcane, and oil palm (palm oil).

6. A process according to claim 1 which is carried out at a temperature of 280 to 350° C.

7. A process according to claim 1 which is carried out at a total system pressure of 12 to 30 MPa and a CO partial pressure from 5 to 10 MPa.

8. A process according to claim 1 which is carried out with a weight ratio of water:biomass material from 0.5:1 to 5.0:1.

9. A process according to claim 1 which is carried out in the presence of an organic solvent.

10. A process according to claim 1 which is carried out in the presence of an organic solvent comprising an alcohol, a phenol, or a carboxylic acid.

11. A process for the conversion of a lignocellulosic biomass material into precursors for liquid hydrocarbon transportation fuels which comprises contacting the biomass material with water and carbon monoxide at elevated temperature of 280 to 350° C., an elevated pressure total system pressure of 12 to 30 MPa and a CO partial pressure from 5 to 10 MPa and a weight ratio of water:biomass material from 0.5:1 to 5.0:1, to dissolve the biomass material into the reaction mixture and depolymerize, deoxygenate and hydrogenate the lignocellulose biomass material, and form a reaction product comprising liquid transportation fuel precursors.

12. A process according to claim 11 in which the water is liquid superheated water.

13. A process according to claim 11 in which the biomass material comprises plant matter, biodegradable wastes, byproducts of farming, food processing wastes, sewage sludge, black liquor from wood pulp or algae.

14. A process according to claim 11 in which the product of the reaction is separated to collect an aqueous stream comprising water-soluble reaction products of the lignocellulose biomass material including acidic components which are effective catalytic promotors for the reaction, and recycling a portion of the stream to the reaction.

15. A process according to claim 14 in which the recycled aqueous stream includes formate anion.

16. A process according to claim 14 in which the catalytic promoter is present in the reaction in an amount from 0.5 to 10 weight percent of the reaction mixture.

\* \* \* \* \*